United States Patent
Beveridge

(10) Patent No.: US 9,081,686 B2
(45) Date of Patent: Jul. 14, 2015

(54) COORDINATED HYPERVISOR STAGING OF I/O DATA FOR STORAGE DEVICES ON EXTERNAL CACHE DEVICES

(71) Applicant: VMware, Inc., Palo Alto, CA (US)

(72) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 145 days.

(21) Appl. No.: 13/717,584

(22) Filed: Dec. 17, 2012

(65) Prior Publication Data

US 2014/0143504 A1    May 22, 2014

Related U.S. Application Data

(60) Provisional application No. 61/728,207, filed on Nov. 19, 2012.

(51) Int. Cl.
| | |
|---|---|
| *G06F 12/08* | (2006.01) |
| *G06F 11/20* | (2006.01) |
| *G06F 12/12* | (2006.01) |
| *G06F 11/34* | (2006.01) |
| *G06F 9/455* | (2006.01) |

(52) U.S. Cl.
CPC ........ *G06F 12/0815* (2013.01); *G06F 9/45558* (2013.01); *G06F 11/203* (2013.01); *G06F 11/3433* (2013.01); *G06F 12/084* (2013.01); *G06F 12/0804* (2013.01); *G06F 12/0866* (2013.01); *G06F 12/0868* (2013.01); *G06F 12/121* (2013.01); *G06F 2009/45579* (2013.01); *G06F 2009/45583* (2013.01); *G06F 2212/214* (2013.01); *G06F 2212/222* (2013.01)

(58) Field of Classification Search
CPC ............................................ G06F 3/061–3/062
See application file for complete search history.

(56) References Cited

U.S. PATENT DOCUMENTS

| | | | |
|---|---|---|---|
| 6,189,080 B1 | 2/2001 | Ofer | |
| 2008/0005478 A1* | 1/2008 | Lubbers et al. | ............... 711/135 |
| 2008/0189468 A1 | 8/2008 | Schmidt et al. | |
| 2011/0145505 A1* | 6/2011 | Anand et al. | .................. 711/130 |
| 2011/0289277 A1* | 11/2011 | Takada et al. | ................. 711/136 |
| 2012/0124294 A1* | 5/2012 | Atkisson et al. | .............. 711/135 |
| 2012/0215970 A1* | 8/2012 | Shats | ............................ 711/103 |

OTHER PUBLICATIONS

European Patent Office, Application No. EP13188646, European Search Report dated Mar. 12, 2014.

* cited by examiner

*Primary Examiner* — Reginald Bragdon
*Assistant Examiner* — Edward Wang

(57) ABSTRACT

A management technique for input/output operations (JO) leverages a hypervisor's position as an intermediary between virtual machines (VMs) and storage devices servicing the VMs to facilitate improvements in overall I/O performance for the VMs. According to this new I/O management technique, the hypervisor sends write requests from VMs destined for storage devices to an I/O staging device that provides higher I/O performance than the storage devices, for caching in the I/O staging device in a write-back mode. Once the I/O staging device has received and acknowledged the write request, the hypervisor immediately provides an acknowledgement to the requesting VM. Later on and asynchronously with respect to the write requests from the VMs, the hypervisor reads the write data from the I/O staging device and sends it over to the storage devices for storage therein.

16 Claims, 4 Drawing Sheets

COORDINATED HYPERVISOR STAGING OF I/O DATA FOR STORAGE DEVICES ON EXTERNAL CACHE DEVICES

CROSS-REFERENCE TO RELATED APPLICATIONS

This application claims the benefit of U.S. Provisional Patent Application Ser. No. 61/728,207, filed Nov. 19, 2012.

BACKGROUND

In virtualized computer systems, in particular ones configured with clusters of host computers each having one or more virtual machines (VMs) running therein and system software for the VMs (commonly referred to as a hypervisor), management of input/output operations (I/O) has been a challenge. Traditional storage devices often struggle to keep up with the flow of storage I/O requests generated by hundreds or even thousands of VMs running in clusters of host computers.

Conventional techniques for solving this problem include the use of storage devices with specially designed caching mechanisms, and multi-tiered storage devices with one or more higher speed storage devices arranged closer to the host computers. These systems may be adequate in handling the flow of storage I/O request but they can be costly and their implementation complex, and do not scale well with the number of VM running in clusters of host computers for such reasons. Also, it is generally the case that these systems are designed to handle peak workloads so as to meet service level agreements (SLAs) specified for them and, as a result, are under-utilized for long periods of time.

SUMMARY

One or more embodiments disclosed herein generally provide a new I/O management technique which leverages the hypervisor's position as an intermediary between the VMs and storage devices servicing them to facilitate improvements in overall I/O performance for the VMs. According to this new I/O management technique, the hypervisor sends write requests from VMs destined for storage devices to an I/O staging device that provides higher I/O performance than the storage devices. Once the I/O staging device has received and acknowledged the write request, the hypervisor immediately provides an acknowledgement to the requesting VM. Later on, the hypervisor, in a process referred to herein as de-staging, reads the write data from the I/O staging device and sends it over to the storage devices for storage therein.

DETAILED DESCRIPTION

Figure 1:
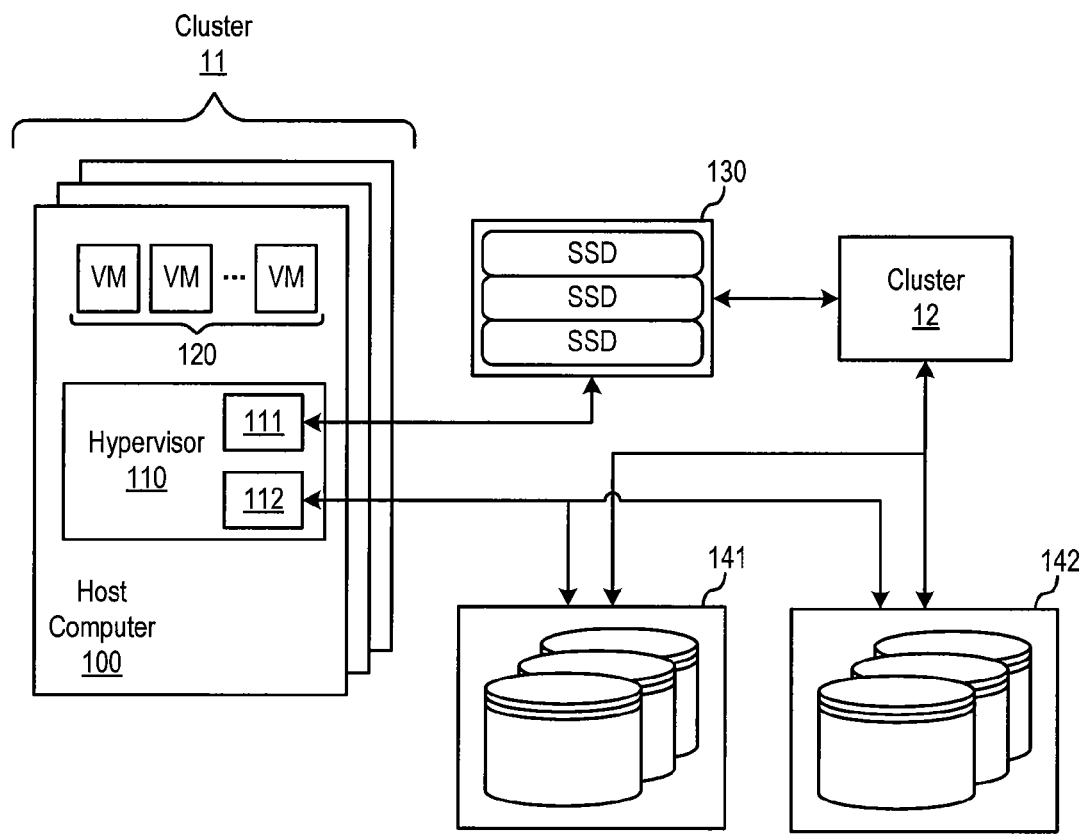
FIG. 1 is a block diagram of a virtualized computer system that is configured with an I/O staging device to support an I/O management technique according to an embodiment.

FIG. 1 is a block diagram of a virtualized computer system that is configured with an I/O staging device to support an I/O management technique according to an embodiment. The virtualized computer system of FIG. 1 includes first and second clusters 11, 12 of host computers. First cluster 11 includes multiple host computers (one of which is labeled as 100) each having one or more VMs (e.g., VMs 120) running therein and a hypervisor (e.g., hypervisor 110) for supporting the execution of the VMs. Persistent storage for the host computers of first cluster 11 is provided by one or more data stores, which are provisioned in storage arrays 141, 142, e.g., as logical units (LUNs) in storage area network devices. Second cluster 12 may also include multiple host computers and be configured in a similar manner as first cluster 11, and persistent storage for the host computers of second cluster 12 is provided by one or more data stores, which can be provisioned in the same storage arrays as first cluster 11. An I/O staging device 130 is shown in this embodiment as a solid state drive (SSD) array that is shared by host computers 100 of first cluster 11 and host computers of second cluster 12. It should be recognized that the number of clusters may be just one or more than two, and the data stores may be provisioned in one or more storage arrays (typically rotating disk based storage arrays) that are lower in cost per capacity than I/O staging device 130.

In a conventional virtualized computer system, the VMs request I/O operations from virtual devices created by the hypervisor, such as virtual disks. The hypervisor, in turn, directs the flow of I/O requests to underlying physical storage devices. The hypervisor must wait for an acknowledgement of writes from the underlying physical storage devices before it can provide an acknowledgement to the VMs. The faster this acknowledgement can be delivered to the VMs, the lower latency operating systems and applications of the VMs will experience.

In the virtualized computer system according to one or more embodiments, in response to I/O operations requested by the VMs (e.g., VMs 120), the hypervisor (e.g., hypervisor 110), in particular a staging module of the hypervisor (e.g., staging module 111 of hypervisor 110), directs the flow of I/O requests first to I/O staging device 130, which in one embodiment is an SSD array which has high I/O performance and low latency delivery of I/O relative to storage arrays 141, 142. Because the SSD array is based on solid state media, it avoids the seek time penalties associated with rotating disk media, and offers strong random write performance. As a result, when viewed from a cost per IOPS (I/O operations per second) basis, the SSD array is less costly than rotating disk-based storage arrays. However, the SSD array has not yet replaced rotating disk-based storage arrays because it is much more expensive on a capacity basis (price per gigabyte of capacity). Accordingly, in the embodiments disclosed herein, the SSD array is employed as an I/O staging device.

For writes I/O requests, once I/O staging device 130 has received and acknowledged the write request, the hypervisor immediately provides an acknowledgement to the requesting virtual machine. Later on, based on an optimized de-staging algorithm executed by a de-staging module of the hypervisor (e.g., de-staging module 112 of hypervisor 110), the hypervisor requests the data back from I/O staging device 130 and sends it over to the data store targeted in the write I/O request. It should be recognized that the hypervisor de-stages the data to the data store in a manner that preserves the write ordering to ensure that data are written to the data store in the same order they left the VM making the write I/O request. For example, the data may be de-staged according to a first-in, first-out (FIFO) method.

This ability to transform a synchronous write to the storage devices into an asynchronous "lazy de-stage" fundamentally changes the performance requirements for storage devices, dramatically lowering the volatility of flow of I/O requests to such devices. I/O staging device 130 is capable of handling all the burst I/O, removing the need for general purpose storage devices to undergo costly modifications to accommodate the high standard deviation of IOPS associated with burst I/O. Providing I/O staging in the manner described herein also solves the cost problem. As noted above, the cost per gigabyte of specialty SSD arrays is high. By using them as an I/O staging device instead of a long-term storage device, a minimal amount of capacity can be purchased, allowing a modestly sized SSD array to accelerate I/O performance of legacy storage devices that are employed as long-term storage devices. In sum, the hypervisor's I/O staging capability creates a meta-storage system that includes three components: (1) the legacy storage devices; (2) the I/O staging device; and 3) the hypervisor. These components operating together create a new high performance storage system with improved ability to handle burst random write I/O.

It should be recognized that caching on SSD resources provided on the host computer for the hypervisor (referred to herein as "local SSD") cannot achieve the functional goals described herein, because the host computer for the hypervisor has multiple single points of failure and the hypervisor consequently cannot be relied upon to de-stage the data cached in the local SSD to the storage device. For this reason, caching on a local SSD must be performed in what is known as a "write through mode" which require that writes be acknowledged on both the local SSD and the storage device before the hypervisor can provide the acknowledgment up to the requesting virtual machine. "Write-through" caching fails to provide the benefit of I/O staging described herein because the storage device still has to handle the full volatility of burst I/O.

Figure 2:
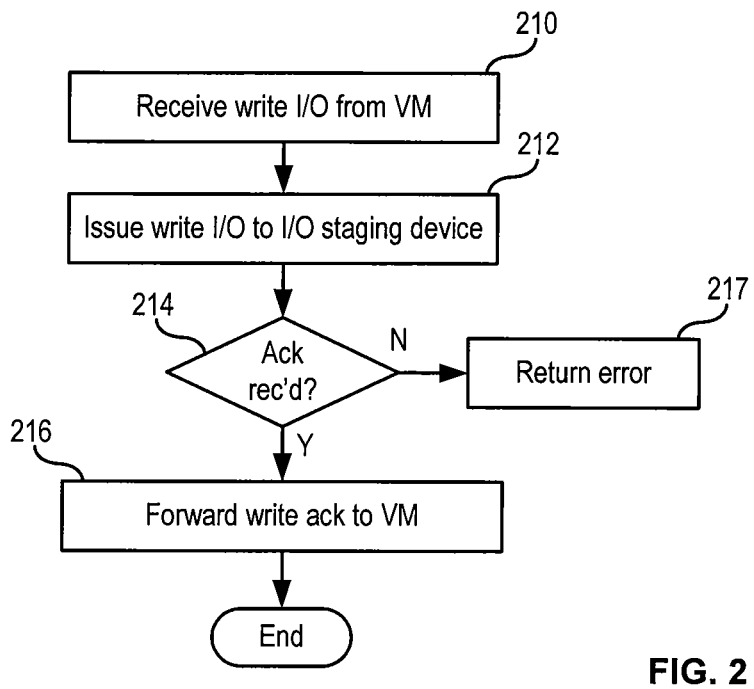
FIG. 2 is a flow diagram of method steps performed by the hypervisor in the virtualized computer system of FIG. 1 to write data into the I/O staging device in response to a write request from a VM.

FIG. 2 is a flow diagram of method steps performed by the hypervisor in the virtualized computer system of FIG. 1 to write data into I/O staging device 130 in response to a write request from a VM. In essence, I/O staging device 130 is performing caching for the storage device in a "write-back mode." "Write-back" caching is achieved in the embodiments described herein with an external SSD array with appropriate resiliency attributes. In one embodiment, XTREMIO® flash array available from EMC Corporation, which has internal failover mechanisms, is employed as I/O staging device 130. Other possibilities include WHIPTAIL® and VIOLIN MEMORY®. As a result of using such I/O staging devices, VMs achieve significant improvements in I/O latency and the flow rate of data to the storage device is controlled to a minimum flow rate and volatility, which means less costly storage devices may be deployed to provide persistent storage support for the VMs.

The method shown in FIG. 2 begins at step 210 where the hypervisor receives a write I/O request from a VM. At step 212, the hypervisor issues the write I/O to I/O staging device 130. If the hypervisor receives a write acknowledgement from I/O staging device 130 as determined at step 214, the hypervisor forwards the write acknowledgement to the VM at step 216. If the hypervisor does not receive a write acknowledgement from I/O staging device 130 in a predetermined amount of time, the hypervisor returns an error message to the VM at step 217.

Figure 3:
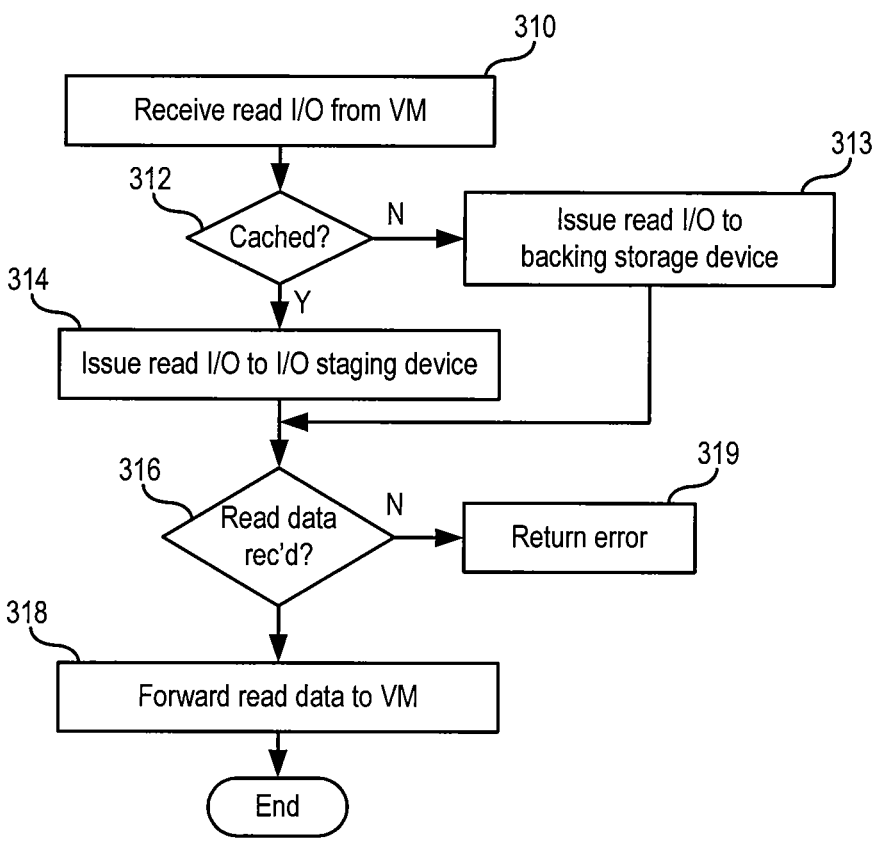
FIG. 3 is a flow diagram of method steps performed by the hypervisor in the virtualized computer system of FIG. 1 to read data from either the I/O staging device or a backing storage device in response to a read request from a VM.

FIG. 3 is a flow diagram of method steps performed by the hypervisor in the virtualized computer system of FIG. 1 to read data from either I/O staging device 130 or a backing storage device in response to a read request from a VM. In general, read I/O requests are directed to the I/O staging device for any data blocks which have been previously written thereto. These data blocks may have been evicted from I/O staging device 130 some of the time but may otherwise be present in I/O staging device 130. Data blocks present in I/O staging device 130 can be retrieved with a much lower latency than retrieving the data from the backing storage device.

The method shown in FIG. 3 begins at step 310 where the hypervisor receives a read I/O request from a VM. At step 312, the hypervisor examines I/O staging device 130 using any of several possible cache lookup methods known in the art to determine if the requested read data is present in I/O staging device 130. If it is not, the read I/O is issued to the backing storage device at step 313. If the requested read data is present in I/O staging device 130, the read I/O is issued to I/O staging device 130 at step 314. At step 316, which is executed after steps 313 and 314, the hypervisor waits for the receipt of the requested read data. If the hypervisor receives the requested read data from either the backing storage device or I/O staging device 130 as determined at step 316, the hypervisor forwards the read data to the VM at step 318. If the hypervisor does not receive the requested read data in a predetermined amount of time, the hypervisor returns an error message to the VM at step 319.

The hypervisor carries out a de-staging process to ensure that I/O staging device 130 does not run out of space. Just as important is ensuring that the flow rate of data from I/O staging device 130 to each of data stores provisioned in the backing storage device proceeds at the lowest rate possible and the least volatility in the flow rate of data. As a result, the performance requirements of the backing storage device can be lowered to allow lower cost and older generation storage arrays to be used.

The goal of de-staging carried out by each hypervisor in the clusters is to minimize the flow rate of data from I/O staging device 130 to the one or more data stores provisioned in the backing storage device for the hypervisor, while ensuring that I/O staging device 130 does not run out of space. In order to achieve ideal de-stage data rates, each hypervisor writing data to a given data store should attempt to write at a data rate which when added to the de-stage data rate of other hypervisors in the same cluster that are writing to the same data store should result in a common average data rate to the data store. Such a data rate is achieved by coordinating between hypervisors in the same cluster.

In one embodiment, each hypervisor can establish a de-stage data rate per data store based on a moving average of the write-rate per minute over a certain number of minutes. For example, if the MB/min average over 15 minutes equals 20 MB, then a simplistic approach would be for the hypervisor to de-stage data at a rate of 20 MB/min to the data store. Over time, this should prevent any significant growth in the amount of space required to stage inbound data on I/O staging device 130. In this way, an appropriate de-stage rate can be calculated for each hypervisor individually on a per data store basis.

To achieve the goal reducing as much volatility from the data stores as possible, the de-stage rate for the entire hypervisor cluster as a whole is kept as close as possible to a common average with a low standard deviation. This can be best achieved if each hypervisor writes data at a rate which facilitates a stable cluster level average per data store rather than simply a common hypervisor average. One way to achieve this is for a single host computer on the cluster to perform a coordination function. A random host computer in the cluster may be elected as the coordinating host computer. Each host computer in the cluster communicates its individual moving average data rate as described above to the coordinating host computer. The coordinating host computer tracks the cluster's moving average, which is the sum of the individual host computer's moving average dividing by the number of host computers in the cluster. The resulting data rate is an average of averages, avoids the fluctuations that may be present in individual hypervisors, and is used as the target de-stage rate for each hypervisor in the cluster.

With each hypervisor de-staging at a common target rate for each data store, staged data may become fully de-staged for a given hypervisor. When this occurs, it is important that the affected hypervisor communicate this back to the coordinating host computer. Upon notification that a given hypervisor has no more data for de-staging on a given data store, the coordinating host computer recalculates the target de-stage rate for the remaining host computers in the cluster capable of de-staging data.

For example, if a ten node cluster's target de-stage rate for data store X is 200 MB per minute, then each hypervisor will have an individual de-stage rate of 20 MB per minute. If one of the ten host computers runs out of data to de-stage, the coordinating host computer simply notifies the remaining nine host computers capable of de-staging data to increase their effective target de-stage rate to 200/9 or 22 MB per minute. If three other host computers run out of data to de-stage, the rate for the remaining host computers will go up to 33 MB per minute. Once other host computers have a defined minimum of data to de-stage, they notify the coordinating host computer and re-enter the de-stage group, reducing the effective target rate per host computer. In this way, the coordinating host computer ensures that the aggregate flow rate of data for each data store remains fairly constant over time and the varying flow rates of data of individual hypervisors are masked.

Figure 4:
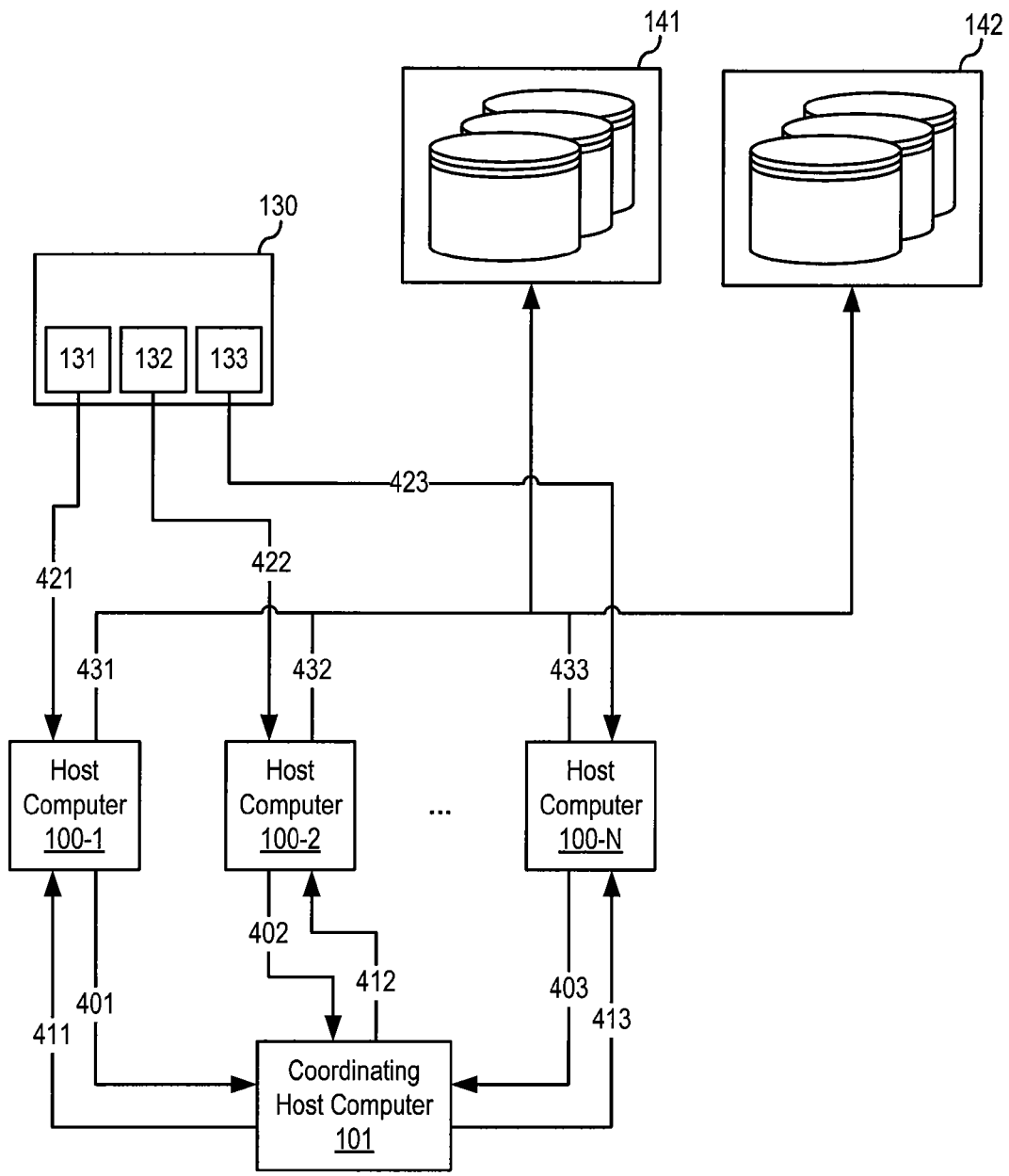
FIG. 4 is a schematic diagram that illustrates the process of de-staging data written into the I/O staging device to free up space in the I/O staging device.

FIG. 4 is a schematic diagram that illustrates the process of de-staging data written into the I/O staging device to free up space in the I/O staging device. Coordinating host computer 101 may be any one of host computers 100-1 to 100-N. Arrows 401, 402, 403 represent the host computers each communicating its moving average of the write-rate per minute over a certain number of minutes to coordinating host computer 101. Arrows 411, 412, 413 represent coordinating host computer 101 communicating to each of the host computers the average of the moving averages communicated by the host computers to coordinating host computer 101. Arrows 421, 422, 423 represent data that were previously staged in I/O staging device 130 being read by the host computers from their respective regions 131, 132, 133 of I/O staging device 130, and arrows 431, 432, 433 represent the writing of the previously staged data that are read by the host computers. The writing of the previously staged data is carried out by each of the host computers at the target de-stage rate communicated thereto by coordinating host computer 101. If a given host computer exhausts its staged data for a given data store, this is communicated to coordinating host computer 101 which recalculates the target rate for the given data store based on the number of host computers remaining in the cluster which continue to have data ready for de-staging to the given data store.

In the event of a hypervisor failure, the staged data from the host computer of the failed hypervisor should be made visible to all remaining host computers in the cluster, so that a hypervisor of another host computer can take over the de-staging from the failed hypervisor. The visibility of staged data is achieved by employing a shared file system across the cluster such as VMware's VMFS (virtual machine file system). In addition, when a hypervisor fails, the VMs running in the host computer of the failed hypervisor are migrated to another host computer, and it is the hypervisor of this new host computer that takes over the de-staging from the failed hypervisor. The failure of the hypervisor may be detected in any number of ways, including the techniques described in U.S. patent application Ser. No. 12/017,255, filed Jan. 21, 2008 and entitled "High Availability Virtual Machine Cluster," the entire contents of which are incorporated by reference herein.

Figure 5:
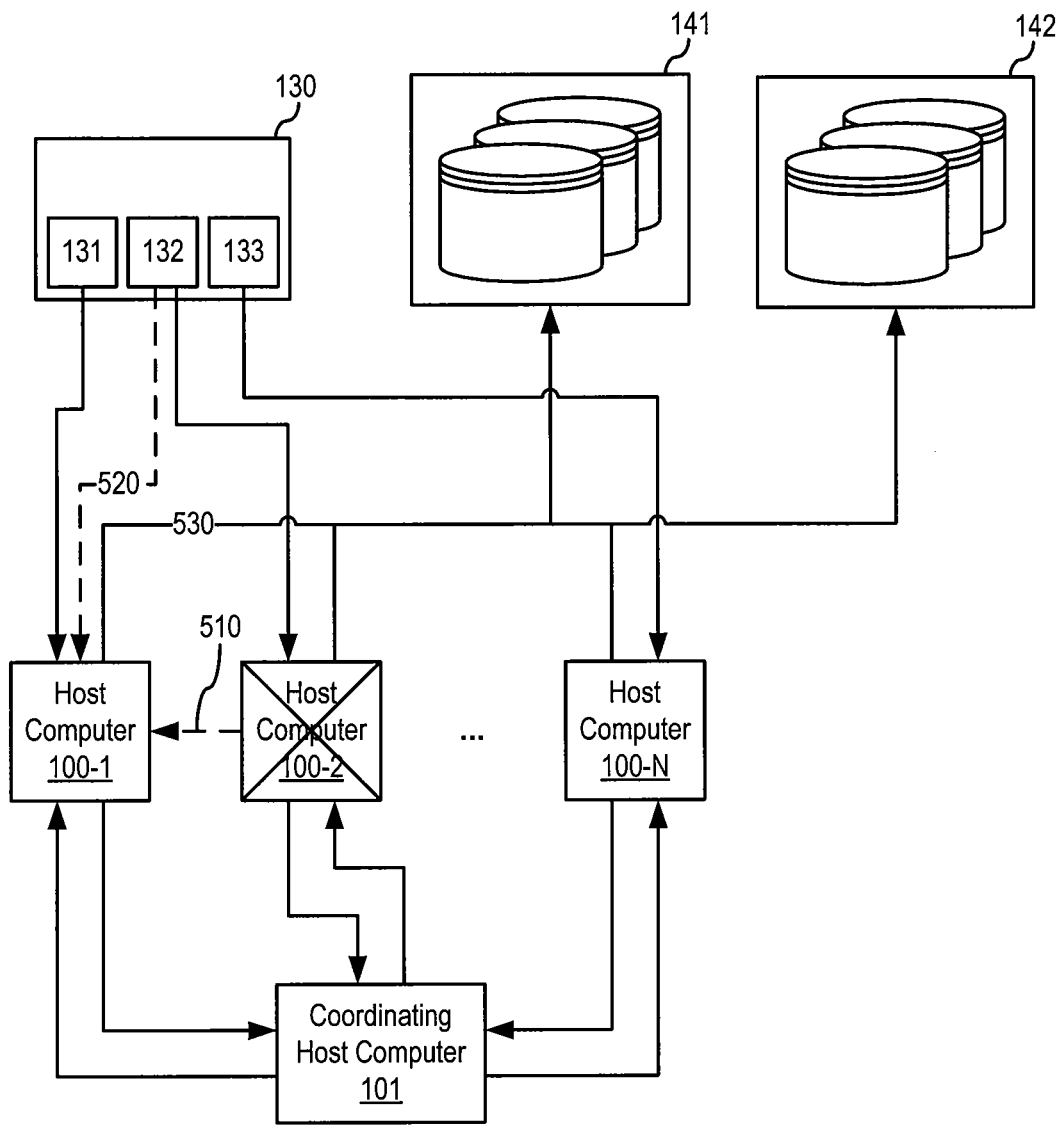
FIG. 5 is a schematic diagram that illustrates the process of de-staging data written into the I/O staging device in the event of a failure in the hypervisor that staged the data into the I/O staging device.

FIG. 5 is a schematic diagram that illustrates the process of de-staging data written into the I/O staging device in the event of a failure in the hypervisor that staged the data into the I/O staging device. In the example given in FIG. 5, host computer 100-2 is shown as having failed, and the VMs running in host computer 100-2 are migrated to host computer 100-1 as indicated by arrow 510. In addition, the hypervisor of host computer 100-1 reads the data staged in region 132 of I/O staging device 130 by the hypervisor of the failed host computer as indicated by arrow 520. Then, as indicated by arrow 530, the hypervisor of host computer 100-1 writes the data staged in region 132 of I/O staging device 130 at the target de-stage rate communicated by coordinating host computer 101.

FIG. 5 provides a simplified example where a single VM is running in each of the host computers. More generally, one or more VMs may be running in each of the host computers. Consequently, staged data for the VMs are tracked on a per VM basis. In one embodiment, the staged data for each VM is stored in one or more cache files associated with that VM on a shared filed system such as VMFS, such that VMs running in a failed host computer can be migrated to live host computers that have access to I/O staging device 130 on a per VM basis. Each such live host computer will then take over the responsibility for de-staging the data from the cache files associated with the VMs that it is running as a result of the migration.

In further embodiments, the staged data for each VM is stored in one or more cache files associated with that VM on a shared filed system such as VMFS, so that de-staging of the data in each such cache file can be carried out by a hypervisor of any host computer as soon as the cache file has reached a set size. For example, once a cache file for a VM reaches a set size, a new cache file is started for that VM, and a random host computer in the cluster of host computers that have access to I/O staging device 130 is selected to de-stage the older cache file. When de-stage of the older cache file is complete, it is deleted. When the next cache file is ready (i.e., reached the set size), a new random host computer is selected to de-stage the data in that cache file. The selection of the host computer for performing the de-staging may be made according to a load balancing algorithm, such as VMware's DRS (Distributed Resource Scheduler). It should be recognized that for any given VM, only one cache file associated with the VM should be allowed to de-stage at one time so that write-ordering is preserved. In the event of host computer failure during the de-staging, new host computers are selected to resume the de-staging on a per VM basis.

It should be recognized that data will be evicted from I/O staging device 130 separately from any de-staging. Based on one of several possible eviction policies, data will be evicted from I/O staging device 130. Examples of such policies include LRU (Least Recently Used) or LFU (Least Frequently Used) or some combination of the two. In addition, the staged data from the various VMs may have differing priorities such that data from some VMs may have prolonged residency in I/O staging device 130 as compared to the data of other VMs.

In the embodiments, the hypervisor provides an arbitration function such that any staging device can be used with any backing storage device. Of course, to attain the benefits described herein, the staging device should provide better I/O performance relative to the backing storage device. As an arbitrator, the hypervisor is able to impose an optimal de-staging flow control system on a per data store basis as described above, which leads to a reduction of burst I/O on the backing data stores and ultimately a reduction in the cost of deploying a storage system that can handle burst I/O. In addition, the hypervisor's position as an arbitrator can be used to impose prioritization of I/O requests on a per VM basis both for queuing on writes and for cache eviction.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer system having a plurality of host computers, each having one or more virtual machines (VMs) running therein and system software that supports the VMs, the computer system comprising:
   a first shared storage device connected to each of the host computers; and
   a second shared storage device that has a larger capacity and higher input/output latency than the first shared storage device,
   wherein the system software of each host computer is configured to cache data that are to be written in the second shared storage device in the first shared storage device in a write-back mode, and wherein the system software of each host computer is configured to copy the data cached thereby in the first shared storage device to the second shared storage device at a first rate, the first rate being based on a plurality of moving average rates, each of which is a moving average rate at which the system software of a corresponding one of the plurality of host computers has cached data in the first shared storage device.

2. The computer system of claim 1, wherein the data cached in the first shared storage device are copied into the second shared storage device asynchronously by the system software with respect to when the data are cached in the first shared storage device.

3. The computer system of claim 2, wherein a system software supporting a VM is configured to handle a write input/output operation of the VM by issuing a write request to the first shared storage device and forwarding a write acknowledgement to the VM upon receiving the write acknowledgement from the first shared storage device.

4. The computer system of claim 2, wherein a system software supporting a VM is configured to handle a read input/output operation of the VM by issuing a read request to one of the first shared storage device and the second shared storage device based on whether or not read data is cached in the first shared storage device.

5. The computer system of claim 1, wherein the first shared storage device is a solid state drive array and the second shared storage device is a rotating disk based storage array.

6. A computer system having a plurality of host computers including a first host computer and a second host computer, each of the host computers having one or more virtual machines (VMs) running therein and system software that supports the VMs, the computer system comprising:
 a first shared storage device connected to each of the host computers; and
 a second shared storage device that has a larger capacity and higher input/output latency than the first shared storage device and is configured with a data store for the VMs running in the host computers,
 wherein the system software in each host computer is configured to cache data to be written into the data store, and to copy the data cached in the first shared storage device thereby into the second shared storage device at a first rate, the first rate being based on a plurality of moving average rates, each of which is a moving average rate at which the system software of a corresponding one of the plurality of host computers has cached data into the first shared storage device.

7. The computer system of claim 6, wherein the system software of the first host computer is configured to compute the first rate as an average of the plurality of moving average rates, each moving average rate being reported to the first host computer by the system software of each of the host computers.

8. The computer system of claim 6, wherein the system software in each host computer is further configured to copy the data cached in the first shared storage device by another system software into the second shared storage device if said another system software has failed.

9. The computer system of claim 6, wherein the data cached in the first shared storage device are evicted according to a least recently used or least frequently used policy.

10. The computer system of claim 6, wherein the data are cached in the first shared storage device with priorities and evicted from the first shared storage device according to the priorities.

11. The computer system of claim 10, wherein the data from a first VM are cached with a higher priority than the data from a second VM, which is provisioned with a lower priority relative to the first VM.

12. In a computer system having a plurality of host computers each having one or more virtual machines (VMs) running therein and system software that supports the VMs, a method of caching write data of input/output operations (IOs) from the VMs, said method comprising:
 upon receipt of a write IO from a VM containing the write data, issuing a request to write the write data to a first storage device;
 forwarding a write acknowledgement to the VM upon receiving an acknowledgement from the first storage device that the first storage device has successfully written the write data therein; and
 after said forwarding, issuing a read request for the write data to the first storage device and then issuing a write request to write the write data to a second storage device,
 wherein:
  the first and second storage devices are shared by the host computers;
  the second storage device has a larger capacity and higher input/output latency than the first storage device; and
  the write data is written to the second storage device at a target rate, the target rate being based on a plurality of rates of successful writes to the first storage device, each rate of successful writes to the first storage device being tracked by one of the host computers.

13. The method of claim 12, wherein the first storage device is a solid state drive array and the second storage device is a rotating disk based storage array.

14. The method of claim 13, wherein the target rate at which data is written to the second storage device is calculated based on the rates tracked by the host computers.

15. The method of claim 12, further comprising:
 tracking a rate of successful writes to the first storage device;
 reporting the tracked rate to a coordinating host computer;
 receiving, from the coordinating host computer, the target rate, the target rate being calculated by the coordinating host computer based on tracked rates reported by all of the host computers; and
 controlling write requests issued to the second storage device based on the target rate.

16. The method of claim 12, further comprising:
 issuing a read request for write data written into the first storage device by a system software that has failed and then issuing a write request to write such write data to the second storage device.

* * * * *